United States Patent

[11] 3,631,430

| [72] | Inventor | Gordon Maurice West<br>Kirkcaldy, Scotland |
|---|---|---|
| [21] | Appl. No. | 795,003 |
| [22] | Filed | Jan. 29, 1969 |
| [45] | Patented | Dec. 28, 1971 |
| [73] | Assignee | The Rank Organisation Limited<br>London, England |
| [32] | Priority | Feb. 12, 1968 |
| [33] | | Great Britain |
| [31] | | 6,842/68 |

[54] POSITION-RESPONSIVE APPARATUS
28 Claims, 5 Drawing Figs.

[52] U.S. Cl. .................................................. 340/200,
324/61 R, 340/177 R, 340/187
[51] Int. Cl. ..................................................... G08c 19/00
[50] Field of Search............................................. 340/200;
324/60, 61, 98, 34 PS; 323/43.5

[56] References Cited
UNITED STATES PATENTS

| 3,071,758 | 1/1963 | Wolfendale .................. | 340/187 |
| 3,287,716 | 11/1966 | Wolfendale .................. | 340/187 |
| 3,296,522 | 1/1967 | Wolfendale .................. | 323/93 |
| 3,297,941 | 1/1967 | Wolfendale .................. | 323/93 |
| 3,348,133 | 10/1967 | Wolfendale .................. | 323/93 |
| 3,372,333 | 3/1968 | Esch............................ | 324/98 |
| 3,383,668 | 5/1968 | Wolfendale .................. | 340/187 |
| 3,383,669 | 5/1968 | Wolfendale .................. | 340/200 |
| 3,384,883 | 5/1968 | Wolfendale .................. | 340/187 |
| 3,162,799 | 12/1964 | Roberts........................ | 323/43.5 |
| 3,179,875 | 4/1965 | Keats............................ | 323/43.5 |
| 3,213,360 | 10/1965 | Cook et al. ................... | 324/61 |
| 3,443,226 | 5/1969 | Knight.......................... | 324/98 |

*Primary Examiner*—John W. Caldwell
*Assistant Examiner*—Robert J. Mooney
*Attorney*—Holcombe, Wetherill & Brisebois

ABSTRACT: An apparatus for determining the relative position of two members in which a voltage from an adjustable supply is used to match the output voltage of a pickup device sensitive to the relative position of the members. The degree of adjustment necessary to provide the match is used as an indication of the relative position.

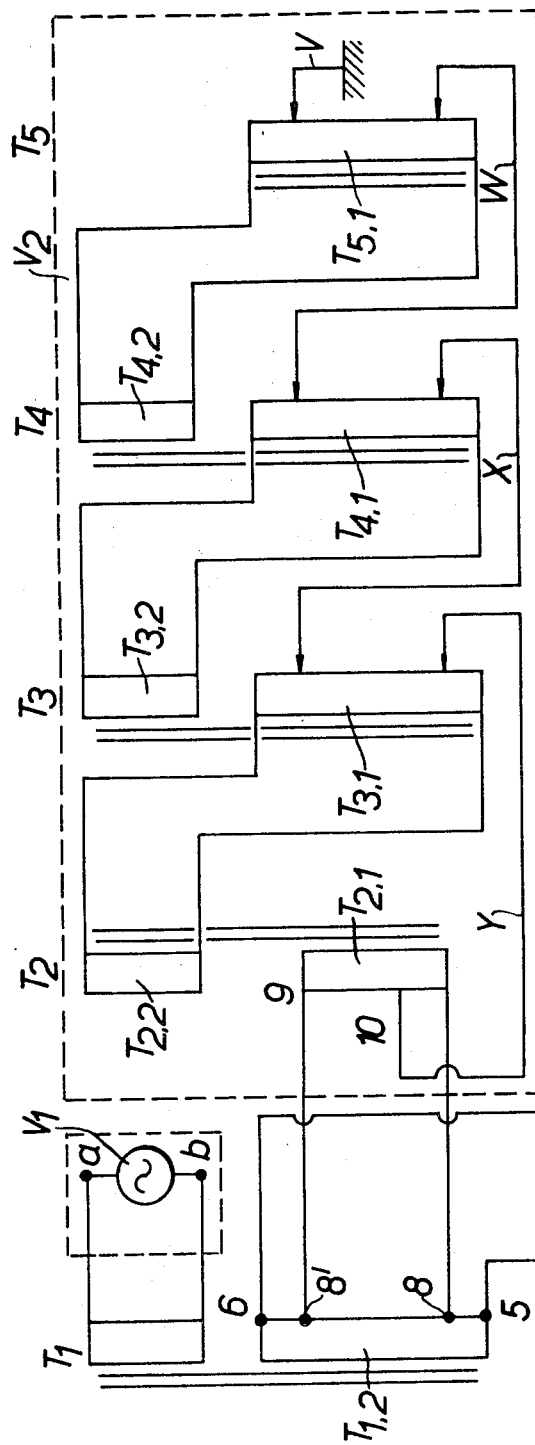
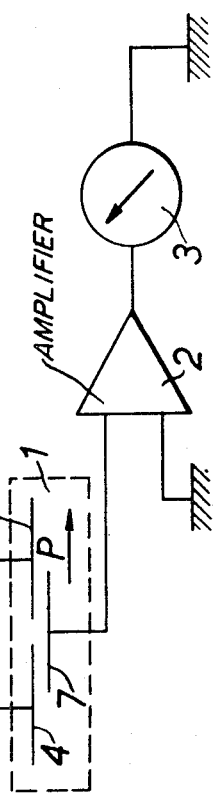
FIG.2.

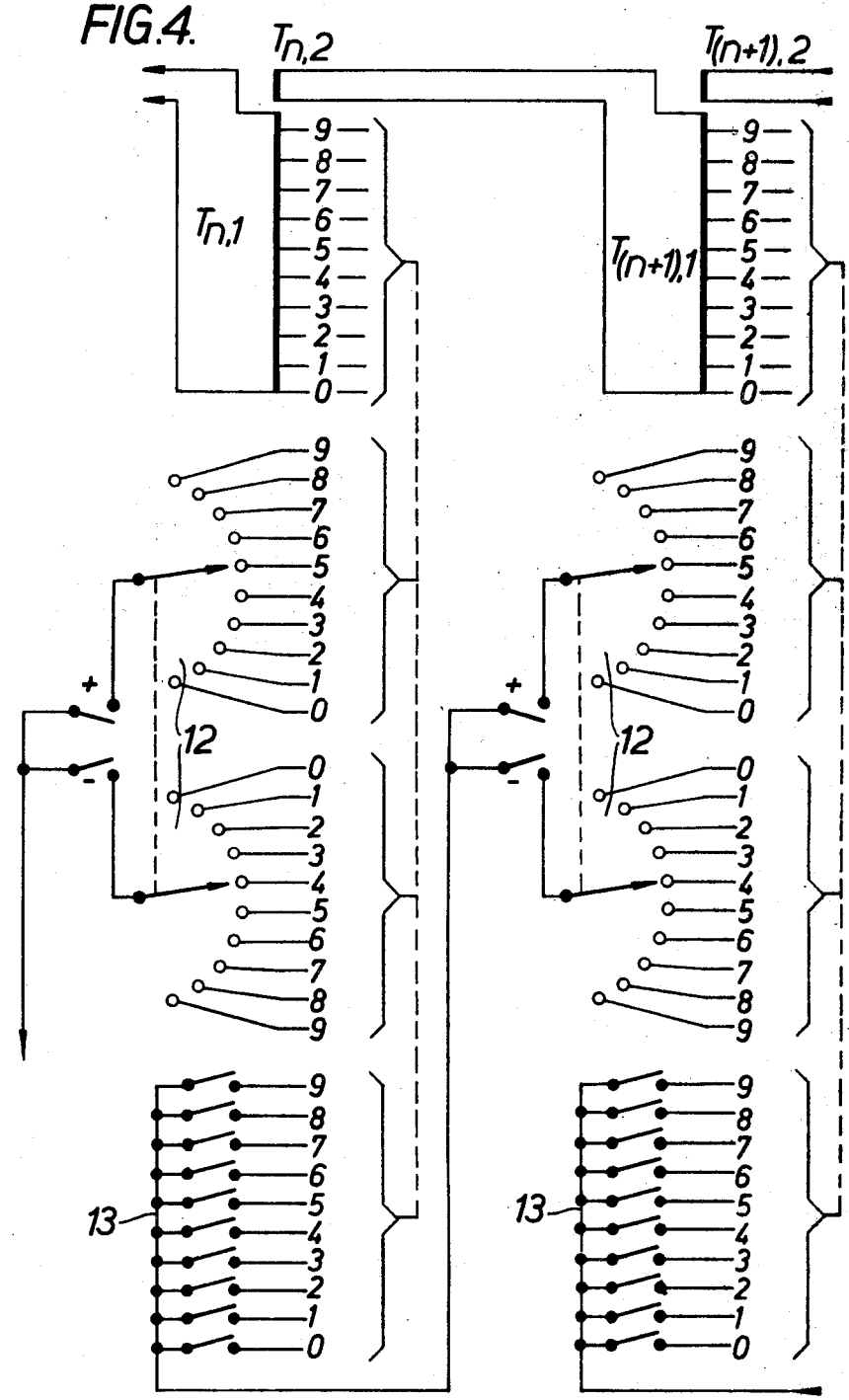

POSITION-RESPONSIVE APPARATUS

This invention relates to position-responsive apparatus for determining the relative position or change of relative position of two relatively movable members or for effecting or controlling a desired relative position of two such members.

This invention provides in one aspect an apparatus responding to the relative position of two relatively movable members and comprising a pickup device fed by an AC power supply and delivering an output voltage, the amplitude of which is related to the relative position of said movable members, and comprising further an adjustable AC compensating power supply also feeding said pickup device, the adjustment of said compensating power supply expressing the relative position of said movable members.

This invention provides further for the use of the above-described apparatus with a pickup formed of a plurality of electrically discrete elements fastened on one of said movable members and an electrode, fastened on said other movable member, mounted for movement with respect to said elements in a direction along the line of elements.

The invention will now be described with reference to the accompanying drawing, in which:

FIG. 2 is a schematic circuit diagram showing an embodiment of the invention where the two AC power supplies are coupled.

FIG. 4 is a detailed circuit showing two decade units of the AC compensating power supply used in the embodiment of FIG. 3.

The position-responsive apparatus described herein makes use of a capacitive potentiometer comprising a series of adjacent elements which are electrically insulated from each other, and to which successively greater AC potentials are applied. An interpolating electrode is arranged to be movable along the series of elements and the potential induced on the interpolating electrode is related to the relative position of the electrode with respect to the elements. The said elements and the said electrode are respectively fastened to one of the said movable members.

Figure 1:
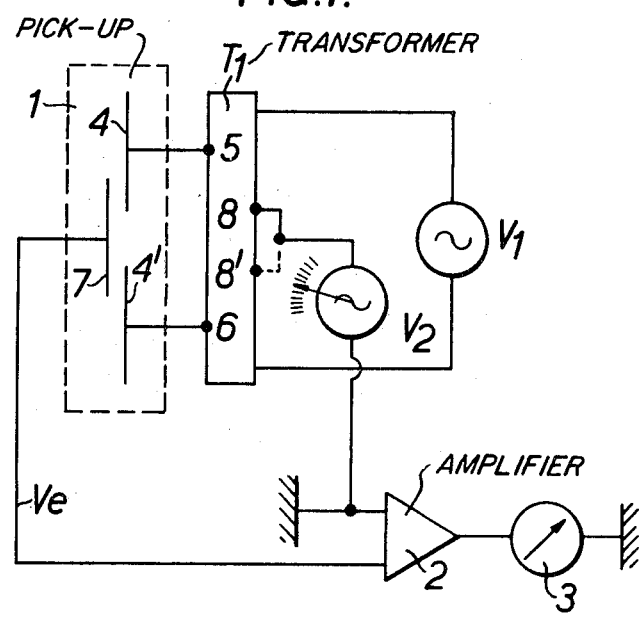
FIG. 1 is a circuit diagram showing the principle of the invention.

FIG. 1 shows the principle of this invention. This circuit comprises a pickup device 1 fed by the secondary of a transformer T1 the primary of which is connected to an AC power supply formed here by a voltage generator V1.

The output voltage $Ve$ of the pickup device is fed to an amplifier 2 feeding in its turn an indicating instrument 3.

An adjustable AC power supply, here also a voltage generator V2, has its output connected to the zero tap of the transformer T1 which tap corresponds to the beginning of the measuring range of the apparatus.

The working of the described apparatus is the following:

When the pickup device is taken out of its zero position, this pickup device delivers an output voltage $Ve$ the amplitude of which is related to the amount of which said pickup device is shifted out of its zero position. If by construction this pickup device is mounted on said two movable members and the zero position of the pickup device corresponds to the zero or rest position of said members, the one with respect to the other; then this output voltage $Ve$ is related to the relative position of said movable members.

By means of the adjustable voltage generator V2 a potential is fed to the zero tap of the pickup-device-feeding transformer T1 and said compensating voltage is adjusted so that it balances the output voltage $Ve$, which condition is verified by means of the indicating instrument 3, which is in fact a zero reading instrument.

When this condition is realized then the adjustment or the setting of the compensating voltage generator V2 is expressing the relative position of the two movable members.

It is to be noted, however, that to obtain a perfect and precise working of the apparatus described the two voltage generators V1, V2, that is the two power supplies, have to be locked in phase the one with respect to the other. This can be achieved by known means which will therefore not be described here.

The pickup can be of any type among the electric devices able to produce an output voltage in response, and related, to the phenomena or physical parameter which has to be observed, measured or controlled. This pickup device can be for example an inductive or capacitive pickup device, a potentiometric device and in the following the above-described position-responsive apparatus will be explained in more detail as used with a pickup device consisting of a capacitive potentiometer comprising a series of adjacent elements which are insulated from each other, and to which successively greater AC potentials are applied. An interpolating electrode being arranged to be movable along the series of elements and the potential capacitively induced on the interpolating electrode, forming an output voltage the amplitude of which indicates the relative position of the interpolating electrode with respect to the elements. Now if this interpolating electrode is moved, say, in conjunction with a machine element such as a machine-tool table and the series of elements are fixed to the machine-tool bed, the induced potential is indicative of the position of the machine element. Such a pickup device is one among others which is perfectly adapted to be used with the apparatus according to this invention. Furthermore, since such a capacitive potentiometer is known, its description will be limited here to the extend necessary for the good understanding of the present position-responsive apparatus.

Coming back to FIG. 1 of the drawings it is to be seen that the pickup device 1 comprises a series of elements 4, 4' which are insulated from each other (two such elements being illustrated in this example), and supplied with increasing AC potentials since they are connected to different taps 5, 6 of a secondary winding of a transformer T1, the primary of which is fed with a given AC potential delivered by the voltage generator V1. This AC voltage generator can for example consist of a common electrical voltage source, so that the output of said voltage generator is not influenced by load variations in the mains.

Figure 5:
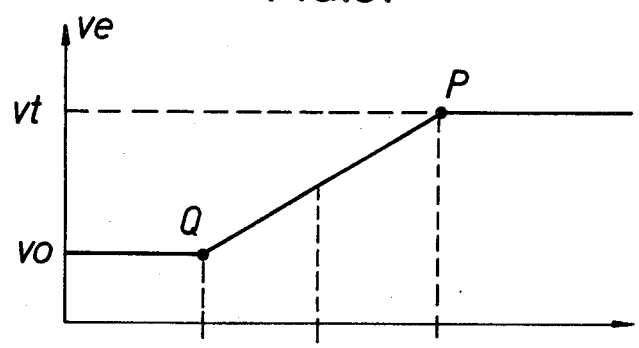
FIG. 5 shows the idealized voltage/position, characteristic of a pickup device.

Furthermore the interpolating electrode 7 of the pickup device has a length equal to the length of each of the elements 4 and therefore the idealized voltage/position characteristic of this pickup device is as shown at FIG. 5. The output potential of said pickup device is equal to $Vo$ when the interpolating electrode is in front of the element 4' and equal to $Vt$ when it registers with element 4 whereas in-between the voltage $Ve$ varies linearly for the successive overlapping positions of electrode 7 and elements 4, 4'.

Now for a given one of said possible overlapping positions, that is for one relative position of the interpolating electrode 7 with respect to the elements 4, 4', corresponds a given output voltage $Ve$ the amplitude of which lies between $Vo$ and $Vt$.

After amplification in 2 this output voltage $Ve$ causes a deviation of the reading instrument 3.

Now according to this invention, an adjustable compensating voltage generator V2 is provided, the output of which is connected to zero taps 8 or 8' of the transformer T1, the position of which corresponds to the point Q or P of the voltage/position characteristic of the pickup device, that is the zero or rest position from which a measurement or a control can be effected respectively the maximum measure possible. In practice these taps 8, 8' do not coincide with the points of the transformer T1 corresponding to the taps 5, 6 since the actual voltage/position characteristic of the pickup device 1 is not as idealized in FIG. 5 but is rounded off at both ends of the inclined proportional measuring range. The points P, Q, of an actual characteristic being thus not at the voltage $Vt$, $Vo$ but at respectively, a higher and lower voltage for which the median portion of the voltage/position characteristic starts to be rectilinear.

So the apparatus is made in such a way that the output voltage of the compensating voltage generator V2 is applied to transformer T1 at points, its zero taps, which correspond to the beginning and ending of the measuring or controlling range of the apparatus.

The output of the compensating voltage generator V2, the phase of which is locked with respect to the phase of the output voltage of the voltage generator V1, is then varied and adjusted until the reading instrument 3 reads zero, that is until the voltage induced in the electrode 7 is balanced. The amount of adjustment of the variable compensating voltage generator V2 is thus an indication of the relative position of the electrode 7 with respect to the elements 4, 4', i.e., of the two movable members to which said electrode and said elements are respectively fixed.

The display of this relative position varies according to the realization structure of the adjusting means of the output of the voltage generator V2 but can in any case be visualized or be made available either in a digital or in an analogue way. For example, if the operating member of these adjusting means of the compensating voltage generator is a knob which can be rotated to vary its output, the angular position of this knob can be determined in terms of length units corresponding to the relative position of said movable members.

It has been noted before that the two voltage generators V1, V2 should deliver output voltages which are in phase the one with the other; this can be achieved as above-mentioned by interlocking two independent generators but an alternative solution is to derive the compensating voltage V2 from the voltage generator V1. Such an embodiment of the position-responsive apparatus according to the invention will now be described in relation to the circuit shown at FIG. 2.

In the embodiment shown at FIG. 2 the apparatus comprises as before a pickup device 1, which is of the above-described type; a transformer T1 feeding said pickup device 1 from a voltage generator V1; an amplifier 2; an indicating instrument 3 and an adjustable compensating voltage generator V2.

In the embodiment shown this compensating voltage generator V2 comprises a number of decade transformers T3, T4, T5. This arrangement permits, the relative displacement of the movable members to be indicated in terms of a three figure number. It is obvious that in other variants a greater number of figures for the indicative number of said relative position could be obtained by increasing the number of decade transformers.

Each of said decade transformers comprises a primary winding T3,1; T4,1; T5,1 and a secondary winding T3,2; T4,2; T5,2 respectively and their transformer ratio is equal to 10:1.

The secondary T3,2 of the first decade transformer T3 is connected across the primary T4,1 of the second decade transformer T4 and so forth so that the secondary winding of each decade transformer, but for the one T5,2 of the last decade, is connected across the primary of the next following decade transformer. Furthermore all the primaries of the decade transformer are divided up in 10 equal winding portions connected respectively to corresponding taps permitting to make available any number of 10ths of the voltages induced in said primaries.

Supposing, to simplify the explanation of this embodiment, that each tap of the primaries T3,1; T4,1; T5,1 can be connected by means of a plug or pin to coupling wires V, W, X, the following steps are required to select a desired compensating voltage.

a. Connect one end of coupling wires W to the zero tap of primary T5,1 or to the tap of this primary corresponding to the last figure of the number expressing the zero offset in terms of the smallest measurable increment or unit.

b. Connect one end of the coupling wire V to another tap of the primary T5,1 so that the amount of 10ths portions taken from one end of the said primary winding T5,1 corresponds to the last figure of the number expressing the relative position of said two movable members expressed in terms of the smallest measurable unit. In that circuit the other end of coupling wire V is connected to the earth.

c. Connect one end of coupling wire X to the zero tap of the primary T4,1 or to the tap of this primary corresponding to the second figure, i.e., of the next higher decade of the said number expressing the zero offset of the apparatus.

d. Connect the other end of coupling wire W to another tap of the primary T4,1 so that the number of 10ths portions taken from one end of this primary winding corresponds to the second figure i.e., the next higher decade, of said number expressing the relative position of said movable members.

e. Connect one end of coupling wire Y to the zero tap of the primary T3,1 or to the tap of this primary corresponding to the first figure i.e., the next higher decade, of said number expressing the zero offset of the apparatus.

f. Connect the other end of coupling wire X to another tap taken from one end of the primary T3,1 so that the number of 10th portions of this primary corresponds to the first figure of said number expressing the relative position of said movable members.

By means of these connections one has achieved that the potential of the free end of the coupling wire Y, with respect to earth, corresponds to the algebraic sum of zero offset and relative position of said movable members. This compensating voltage is thus able to balance the voltage induced on the electrode 7 of the pickup device when said electrode is so positioned to correspond to a displacement out of its rest or zero position by said zero offset value plus the desired relative position of said movable members.

This balancing is effected through a coupling transformer T2 the primary of which T2,1 has one end connected to point 8 of transformer T1, the other end and its midpoint ending to corresponding taps 9, 10 which are respectively connected to point 8' of the secondary of the transformer T1 and to the other end of coupling wire Y.

The secondary of this coupling transformer is connected across the primary T3,1 of the first decade transformer T3.

This coupling transformer makes it possible through permutation of its connection with the primaries of transformer T1 and T3 to achieve the right compensation voltage for the following conditions:

a. For a positive relative displacement of the movable members from their rest position.

b. For a positive or negative relative displacement of the movable members from a shifted rest position.

c. For a negative relative displacement of the movable members from their end position, i.e., their position of maximum displacement.

The working of the embodiment described hereabove can show two alternatives; the apparatus works as a measuring instrument or the apparatus works as a control device.

In the first instance the operator sets the zero offset plugs of the decade transformer to the taps of these transformers corresponding to the zero offset figure desired, i.e., the position out of which the movable members will be moved. Then the movable members are displaced of a value which has to be measured. Finally by setting the position plugs of the decade transformer by successive tentative approaches, the operator balances the voltage delivered by the pickup device 1. The balanced condition can be determined by the reading instrument 3. The amplitude of the displacement of the movable members is given by the number obtained in reading for each decade the number of 10ths portions of the corresponding decade transformer primary.

It is obvious that the connections of each decade transformer to its zero and position plugs can be achieved by means of selector switches having 10 positions. It is also obvious that by duplicating the contacts of said selector switches and their suitable connection to a display device, this display device is automatically controlled to indicate the relative displacement of the movable members as the balancing operation is done.

In the second instance, i.e., in the case of a control apparatus, the setting of the zero offset is made as described hereabove, but then, as the setting of the position plugs is achieved, a control unit (not shown) consisting mainly of a comparator of the output voltage of the pickup device 1 with the compensating voltage and an actuator causing the displacement of the movable members, the one with respect to the other, as long as the comparator output is not zero automatically places the movable members in the desired position, corresponding to the selected compensating voltage.

Figure 3:
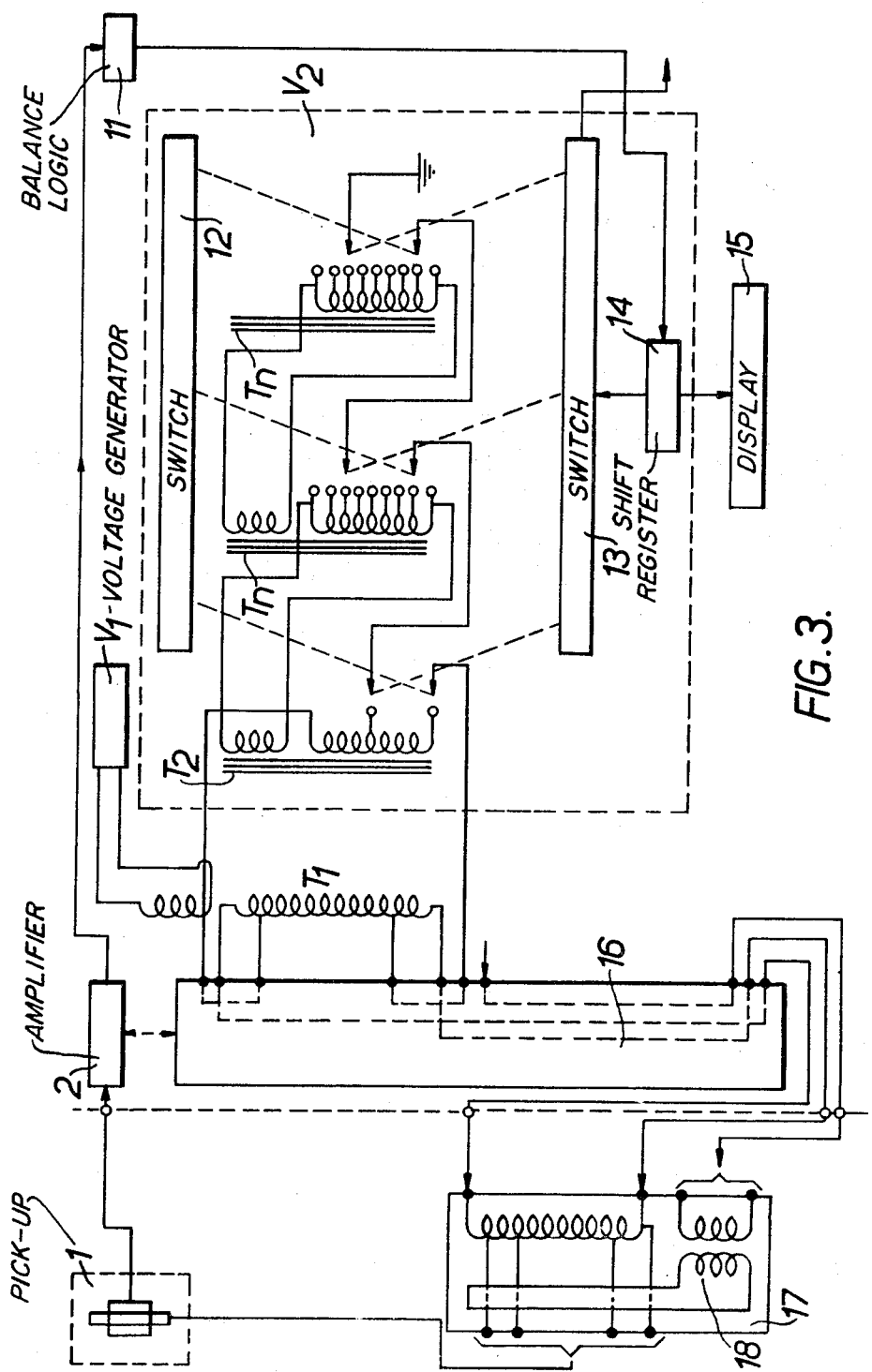
FIG. 3 is a block diagram of a possible embodiment.

Now as the principle of the position-responsive apparatus according to the present invention has been described and explained in the foregoing, other aspects of the present invention will be disclosed in relation to an automatic control embodiment of the position responsive apparatus which is shown on FIGS. 3 and 4.

In FIGS. 3 and 4, the elements of the apparatus corresponding to those which have been already described bear the same reference numerals.

The output of the pickup device 1 is connected to the amplifier 2 which feeds a balance logic 11 which according to its built-in circuits determines, in response to the amplitude of the amplified output voltage of the pickup device 1, the sequence in which the position selector switches of the compensating voltage generator V2 have to be positioned to obtain, with the least possible steps, the balanced condition.

This compensating voltage generator V2 comprises as previously described the decade transformers Tn (two only being shown) and the coupling transformer T2. The generator V2 comprises further manual zero-set switches 12 and relay position switches 13. The manual zero-set switches 12 permits adjustment of the generator V2 to the desired zero offset whereas the relay position switches 13 enables adjustment of this generator to deliver the desired compensating voltage for obtaining the balanced condition of the apparatus when a relative displacement of the movable members has taken place. These relay position switches 13 are controlled by the output of the balance logic 11 through a decimal shift register 14. This decimal shift register 14 controls also a display 15 of the actual relative position of the movable members.

The voltage generator V1 is formed by an oscillator feeding the primary of the transformer T1.

FIG. 4 illustrates the detailed circuit and connections of two successive intermediate decade transformers T3, T4 provided with their relay position switches and their decimal shift registers. Two sets of relay switches are used for each decade, which works alternatively when the displacement of the movable member has to take place in the positive or the negative direction. The least significant decade is of course different.

All the elements mentioned before, which are shown in block form on FIG. 3 are well-known devices which can be adapted to the present apparatus by any person skilled in the art. Furthermore all the elements of this embodiment described up to here, but for the pickup device 1, can be housed in a transportable box, the indicator box.

This indicator box can be made to a multipurpose indicator box, i.e., able to be used with several different potentiometric pickup devices; able to effect measurements of radii and of diameters and able to display the relative displacement of the movable members in different units, i.e., metric or English units for example.

This can be done by adding relatively small modifications to this indicator box with respect to its complexity. All that is required is to provide transformer T1 with enough taps in its secondary winding to provide for the necessary feeding voltages of the elements of several capacitive potentiometers and to provide for their respective zero and maximum points to be able to apply the compensating voltage at the right points for each capacitive potentiometer; to provide a gain adjustment of amplifier 2 which can be made by a feedback loop one passive element of which determining the gain factor, is interchangeable and connectable from the outside of the indicator box; and a transformer of the type of the one described in my copending application, Ser. No. 794,262, filed Jan. 29, 1969 in the control of the decimal shift register 14.

Having now this indicator box which can be fitted with numerous capacitive potentiometers and adapted for effecting different measurements one further aspect of the invention is to provide a simple means for coupling a given capacitive potentiometer to this indicator box and for making the right connection for the desired measurement.

To this end all the necessary connection between the coupling transformer T2 and transformer T1 as well as between this transformer T1 and the elements of the capacitive potentiometer; for the gain adjustment of amplifier 2 and for the change in measuring units are provided by means of a program plug. This plug is a multipin plug intended to cooperate with a corresponding socket fixed on the indicator box and to which ends all connection possibilities. The program plug itself comprises the necessary shunts between its pins, and the passive element for the feedback loop of amplifier 2 so that when it is plugged in its sockets a given connection pattern is realized which corresponds to the selected capacitive potentiometer, the measuring units and the amplifier gain needed.

When the indicator box is to be used with another capacitive potentiometer or with other measuring units or with another gain factor for amplifier 2, another program plug is fitted in the said socket which provides the necessary connection for this new use. This program plug is schematized in 16 on FIG. 3.

The advantage of this is, that it is frequent for a user to have several pickup devices; adapted to specific measurements, displacement ranges, and so on; which are only seldom or even never used simultaneously. With this apparatus, this user can have only one indicator box which can be fitted with all its pickup devices instead of having a particular indicator box for each of said pickup devices. This represents a great saving of investment costs, a great variability of use.

Another aspect of this invention relates to the correction, by electrical means, of the manufacturing errors in the mechanical dimensions of capacitive potentiometers to be used with the above-described indicator box.

It is known to correct these errors of the capacitive potentiometers by adding a correction transformer in the input to each element of said potentiometer. This is achieved for example as described in British Pat. No. 996,086. However in this type of correction transformer it is necessary to match the indicator, or electronic part of the apparatus, to a given capacitive potentiometer. This is to be avoided if the advantages of the multipurpose indicator box have to be maintained.

This invention provides therefore for a correction box which is adapted, in conjunction with a program plug, to effect the desired voltage correction for any capacitive potentiometer which can be fitted to the indicator box.

This correction box 17, or transducer matching unit, is connected across the secondary of transformer T1 through the program plug which makes available in the correction box the supply voltages for each element of the capacitive potentiometer used as selected by the program plug among all the possible supply voltages delivered by the indicator box.

Therefore on top of the nominal voltages for the elements of the desired transducer this correction box provides for voltages which differ from one another of an amount less than the desired precision of the apparatus and the sum of which is at least sufficient to compensate the maximum mechanical error of a transducer element.

To provide the precision required these voltages are obtained by means of toroidal transformers 18 fed by the indicator box and adapted to deliver voltages which can be combined to obtain any voltage necessary to compensate a mechanical error of a transducer element within a given precision range.

It is then possible to adjust the nominal voltage for each element of a transducer in adding the desired correction voltage; this can be done by a plug board on the top of the correction box or directly by suitable connections made in the male connector by the connecting plug of the transducer.

Therefore it is possible with a set of program plugs (for selecting the desired internal connections of the indicator box, for providing the nominal element voltages for a given transducer, for selecting the desired scale, for selecting the measuring units and so on) and a correction box (providing the necessary electrical adjustments to the nominal voltages for compensating the mechanical errors of the elements of the transducer) to use the indicator box with any transducer for any desired measurement.

It is obvious that many variants or technical equivalents could be thought of, therefore the invention is not restricted to the details of the foregoing examples, but includes rather all embodiments and realizations falling within the scope of the following claims. For example it would be possible to use autotransformers for the adjustable compensating voltage generator $Ve$ instead of mulitwindings transformers.

I claim:

1. A position-responsive apparatus for determining the position of two relatively movable members, comprising a pickup means having a first part connected to a first one of said relatively movable members and a second part connected to a second one of said relatively movable members, a first AC power supply means connected to said first part of said pickup means which pickup means provides an output voltage depending on the relative positions of said relatively movable members to which said pickup means are connected, means coupled to said second part of said pickup means determining initial output voltage from said second part of said pickup means corresponding to a given relative position of said relatively movable members, second AC power supply means connected to said first part of said pickup means and applying thereto a compensating voltage in opposition to said first AC power supply means, means adjusting said compensating voltage from said second AC power supply means to reestablish said initial output voltage from said second part of said pickup means upon relative movement of said relatively movable members from said given relative position, and means determining the adjustment of said adjustment means to provide therefrom an indication of said relative movement of said relatively movable members.

2. A position responsive apparatus according to claim 1 in which the two power supplies are independent, means being provided to lock the phase of the output of one said supply with respect to the other.

3. A position responsive apparatus according to claim 1 in which the second power supply is derived from the first power supply, said second power supply being formed of passive elements fed by said main power supply and adapted to deliver said compensating voltage.

4. A position responsive apparatus according to claim 1 in which the pickup device is formed by a capacitive potentiometer.

5. A position-responsive apparatus according to claim 3 in which the second power supply is an adjustable voltage generator consisting of a plurality of transformers fed by the main power supply and delivering the compensating voltage.

6. A position-responsive apparatus according to claim 1 characterized by a display device for indicating the relative position of the movable members.

7. A position-responsive apparatus according to claim 6 in which the output voltage of said pickup device is amplified by an amplifier and displayed by the display device.

8. A position-responsive apparatus according to claim 6 in which said display device is a zero reading instrument permitting the determination of the compensated condition of the apparatus; in which the compensating voltage equals the output voltage of the pickup device and cancels it, for which the degree of adjustment of the second power supply corresponds to the relative position of said movable members.

9. A position-responsive apparatus according to claim 5 in which the plurality of transformers of said second power supply are decade transformers one said transformer for each digit of a number representing the relative position of said movable members.

10. A position-responsive apparatus according to claim 9 in which each of said decade transformers comprises a primary winding divided in 10 equal winding portions connected in series and in which each said primary winding portion has its ends connected to corresponding transformer taps.

11. A position responsive apparatus according to claim 10 in which the transformation ratio of each said decade transformers is 1 : 10.

12. A position-responsive apparatus according to claim 11 in which the secondary winding of all other decade transforms is connected across the primary winding of the next lower decade transformer.

13. A position-responsive apparatus according to claim 12 in which the primary winding of the first decade transformer is connected across the secondary winding of a coupling transformer.

14. A position-responsive apparatus according to claim 13, in which the compensating voltage is taken between two taps of the coupling transformer primary winding and is connected to the output of the main power supply.

15. A position-responsive apparatus according to claim 1 in which the first power supply is formed by a voltage generator consisting of a feeding transformer the primary of which is fed by a stabilized voltage supply and the secondary of which delivers, at corresponding taps, the different voltages for the feeding of the pickup device.

16. A position-responsive apparatus according to claim 13 in which the compensating voltage delivered by the coupling transformer is applied to the secondary winding of the feeding transformer between points intermediate the ends of said secondary winding which correspond to the start and end of the measuring range of the pickup device.

17. A position-responsive apparatus according to claim 14 in which each tap of the primary winding of each decade transformer and of the coupling transformer is connected, on the one hand, to the corresponding contact of a manual zero-set selector switch, and on the other hand, to the corresponding contact of a position selector switch.

18. A position-responsive apparatus according to claim 17 in which the arm of the position selector switch or of the zero-set switch of any decade transformer is grounded whereas the arm of each of the other position selector switches is connected to the arm of the zero-set selector switch of the next lower decade transformer.

19. A position-responsive apparatus according to claim 17 in which the zero-set selector switch arm of the coupling transformer is connected to the secondary of the feeding transformer at a point of which corresponding to the start or the end of the measuring range of the pickup device.

20. A position-responsive apparatus according to claim 19 in which the relative position of the movable members is given by the position of the zero-set and position selector switches in the compensated condition of the apparatus.

21. A position-responsive apparatus according to claim 20 in which the position selector switches are manual ones.

22. A position-responsive apparatus according to claim 21 in which said display device is controlled by the position of the zero-set and position selector switches.

23. A position-responsive apparatus according to claim 15 in which the pickup device feeding transformer is adapted to deliver nominal voltages corresponding to different pickup devices.

24. A position-responsive apparatus according to claim 23 which comprises a set of program plugs, each adapted to fit in a socket in the apparatus and comprising the necessary connexion means for selecting the adequate feeding voltages for a given pickup device; and the units in which the relative position of the movable members is measured.

25. A position-responsive device according to claim 24, an amplifier amplifying said output voltage of said pickup device, said program plug further selecting the gain of the amplifier amplifying the output voltage of said pickup device.

26. A position-responsive apparatus according to claim 24 in which a pickup-device-matching unit means is provided permitting suitable correcting voltages to be added to the nominal feeding voltages for compensating possible mechanical lack of precision of the pickup device.

27. A position-responsive apparatus according to claim 26 in which said matching unit is adapted to deliver any voltage, in increments corresponding to the apparatus precision, up to the one necessary to compensate for the maximum acceptable mechanical error of the pickup device.

28. A position-responsive apparatus according to claim 27 which is contained in a multipurpose indicator box having the voltage generators and their associated electronics, a set of pickup assemblies, a matching unit and a set of program plugs.

* * * * *